(12) United States Patent
Ohkubo et al.

(10) Patent No.: US 7,702,149 B2
(45) Date of Patent: Apr. 20, 2010

(54) METHOD, APPARATUS, AND PROGRAM FOR IMAGE CORRECTION

(75) Inventors: Akito Ohkubo, Kanagawa-ken (JP); Yoshifumi Donomae, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 992 days.

(21) Appl. No.: 11/445,323

(22) Filed: Jun. 2, 2006

(65) Prior Publication Data
US 2006/0274936 A1 Dec. 7, 2006

(30) Foreign Application Priority Data
Jun. 2, 2005 (JP) ............... 2005-162836

(51) Int. Cl.
*G06K 9/00* (2006.01)
(52) U.S. Cl. ................ 382/167; 358/518
(58) Field of Classification Search ........... 382/100, 382/117, 118, 167; 358/518–523
See application file for complete search history.

(56) References Cited

U.S. PATENT DOCUMENTS

| | | | | |
|---|---|---|---|---|
| 6,711,286 B1 * | 3/2004 | Chen et al. | ............ | 382/162 |
| 7,024,035 B1 * | 4/2006 | Enomoto | ............ | 382/167 |
| 7,068,835 B1 * | 6/2006 | Ban et al. | ............ | 382/154 |
| 2001/0005222 A1 * | 6/2001 | Yamaguchi | ............ | 348/223 |
| 2002/0126893 A1 * | 9/2002 | Held et al. | ............ | 382/167 |
| 2004/0017938 A1 * | 1/2004 | Cooper et al. | ............ | 382/171 |
| 2007/0041640 A1 * | 2/2007 | Tabata et al. | ............ | 382/173 |

FOREIGN PATENT DOCUMENTS

| | | |
|---|---|---|
| JP | 10-126184 A | 5/1998 |
| JP | 2001-209802 A | 8/2001 |

* cited by examiner

*Primary Examiner*—Anand Bhatnagar
(74) *Attorney, Agent, or Firm*—Sughrue Mion, PLLC

(57) ABSTRACT

An image correction method comprising the steps of: specifying a region including the face of one person in an image of people displayed in a screen of image display means in response to an input from an operator; extracting a correction target region including at least the face of the person in the image, based on information on at least one of hue, saturation, lightness, and a position of an outline of the specified region; setting a degree of correction to be carried out on each position in the correction target region in such a manner that the degree of correction becomes lower from the inside of the correction target region to the outside thereof near a boundary of the correction target region; and correcting at least one of hue, saturation and lightness in the correction target region based on the degree of correction.

21 Claims, 10 Drawing Sheets

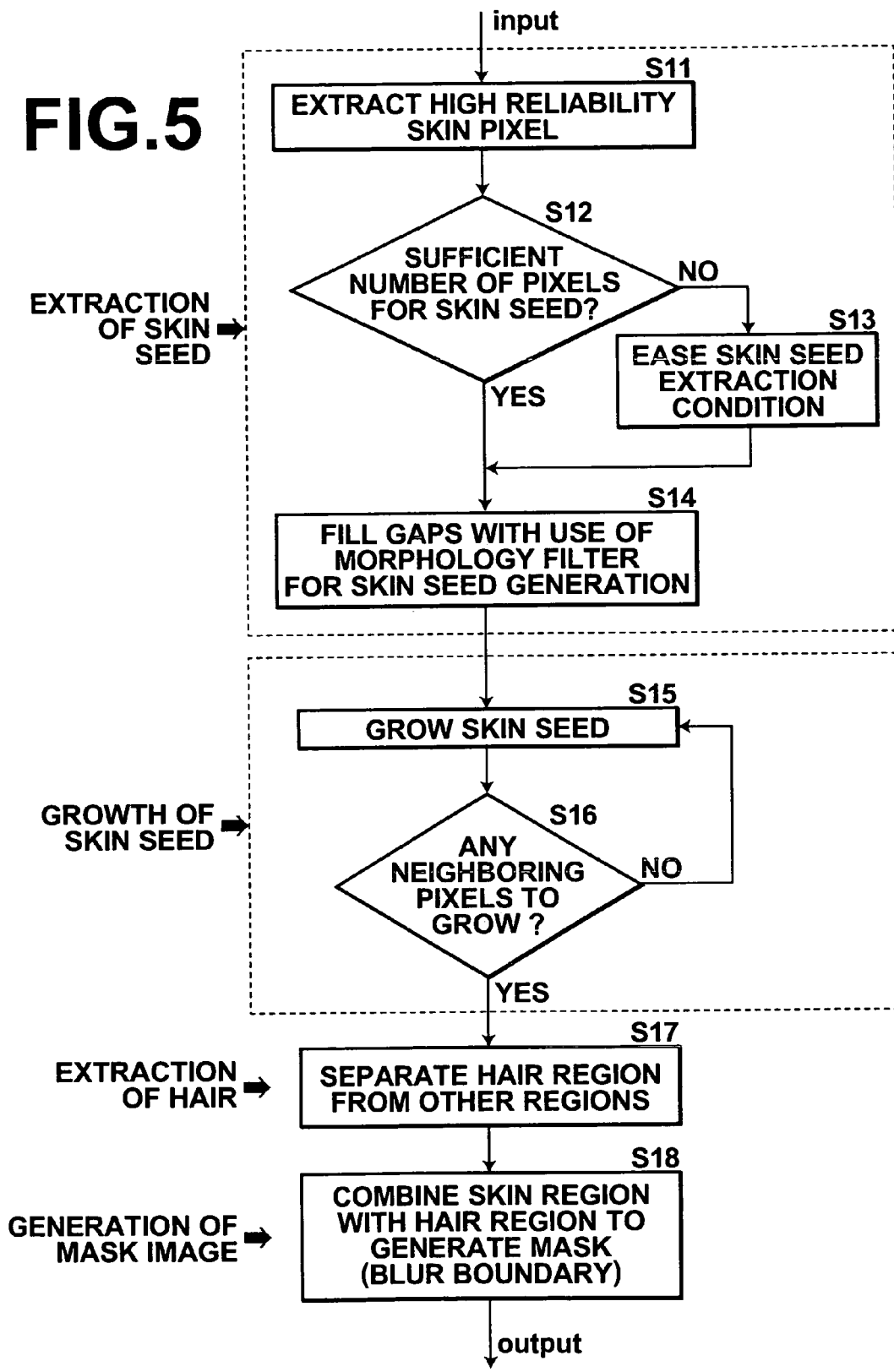

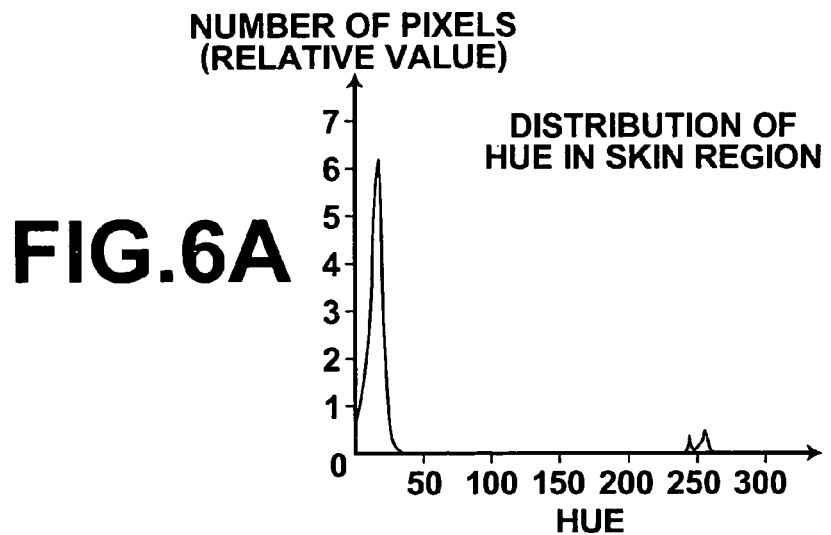
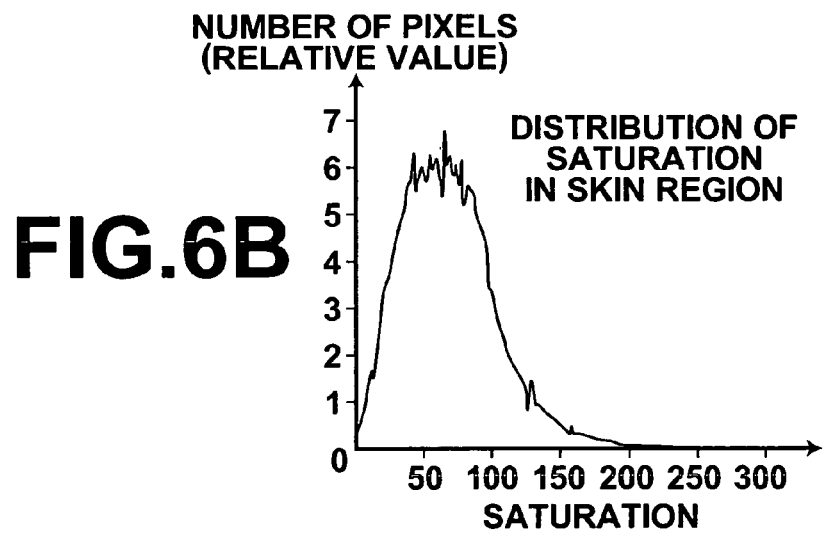
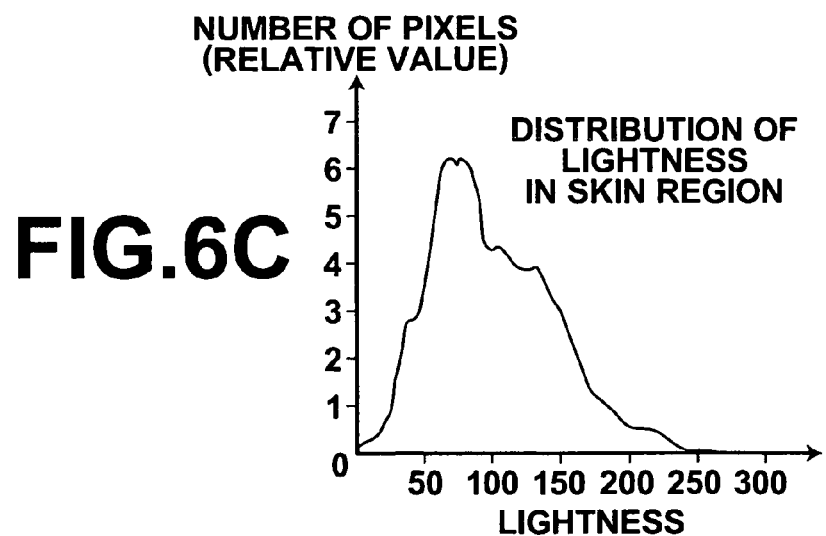

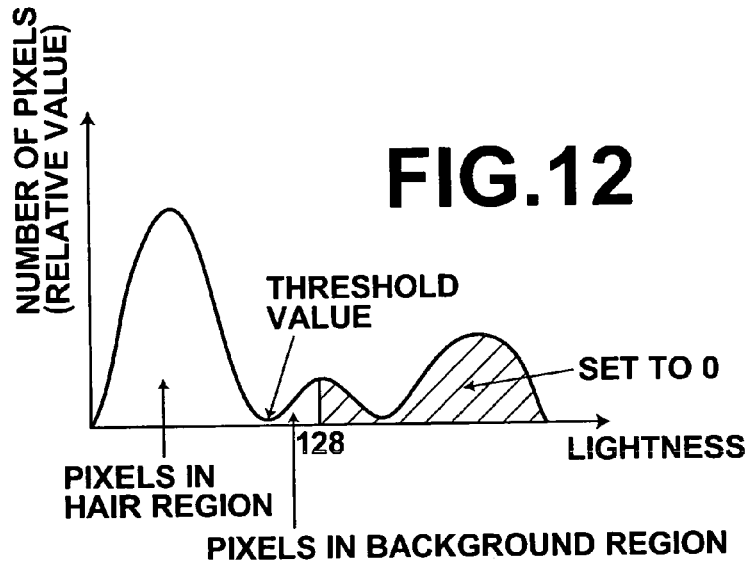
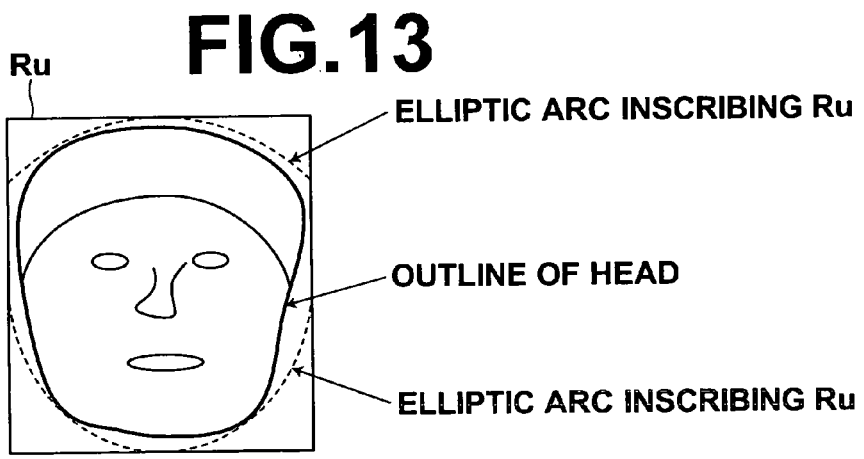
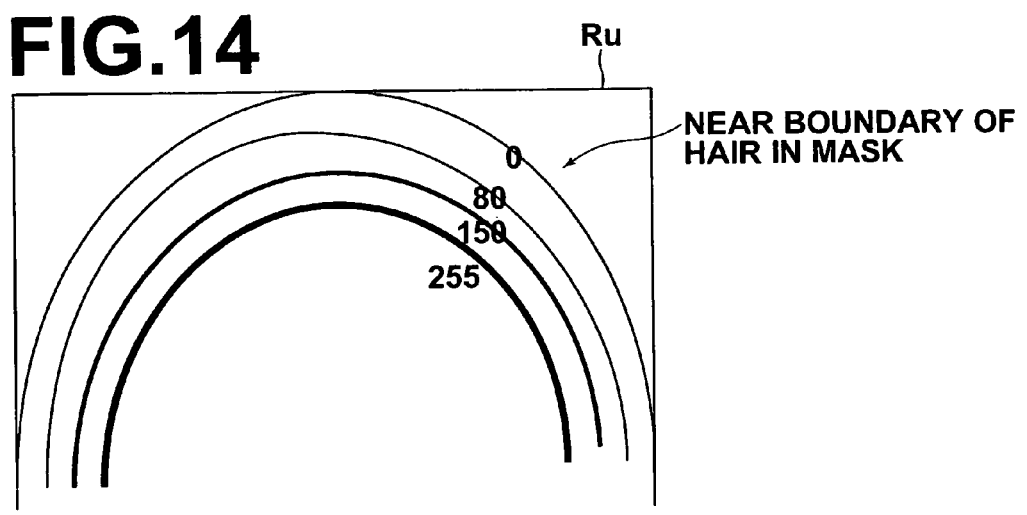

METHOD, APPARATUS, AND PROGRAM FOR IMAGE CORRECTION

BACKGROUND OF THE INVENTION

1. Field of the Invention

The present invention relates to an image correction method and an image correction apparatus for correcting lightness and color of a region such as human face and skin in a digital image. The present invention also relates to a program therefor.

2. Description of the Related Art

In some digital photograph images obtained by photography with a digital camera or by reading a photograph output on a paper medium or the like with a scanner, lightness and color thereof are not represented in an appropriate or desired manner due to a photography condition and a characteristic of a subject. Although correction of lightness and color may be necessary, application of predetermined correction processing on an entire image is not appropriate in some cases.

For example, in the case of a photograph image whose subject is a person photographed in a state of underexposure or in presence of backlight, lightness of the face of the person may need to be corrected since the face is dark. However, if gradation correction processing causing lightness of the face to become appropriate is applied to the entire image, white compression may occur in the background. Furthermore, in the case where only a person at an end of a rear row looks dark due to insufficient illumination thereon in a class photo photographed in a photographic studio or the like, or in the case where one of two people in a photograph image is extremely tanned and the face of the person thus looks dark, it may be preferable for lightness of the dark face of the person to be corrected according to lightness of other faces or the other face. However, if gradation correction processing is applied to the entire image for causing only the face of the person to become lighter, the faces of others or the face of the other person become(s) too light beyond an appropriate range.

In order to avoid such a problem, partial correction such as correction of only the face or skin of a person may be desired, instead of correction of an entire image. For partial image correction, various kinds of methods have been proposed.

For example, an identification photograph system has been proposed in U.S. Patent Application Publication No. 20010005222 for carrying out image processing only on a person. In this system, a region of a person is automatically separated from a region of background in an image, and a skin color of the person is automatically adjusted while the background is replaced with a background prepared in advance. The person after the automatic adjustment is then composited with the changed background.

An automatic dodging technique for face has also been described in Japanese Unexamined Patent Publication No. 10(1998)-126184. In a method described therein, a face region is extracted, and a skin region therein is subjected to preferable processing. The face region after the processing is then composited with the remaining region.

In Japanese Unexamined Patent Publication No. 2001-209802, a method of face extraction has been described. In this method, a face template comprising a wire frame or the like is displayed beside a photograph image, since a face may be extracted erroneously if extracted with reference to only a color of a pixel in a skin-color region in a specified region. Therefore, a position of a face in the image is matched with a position of the face template, and the face is extracted based on a result of the matching.

Furthermore, a method has been proposed in U.S. Pat. No. 7,024,035 for improving efficiency of automatic red-eye correction through easy specification of a red-eye region by an operator in advance, although this method is not related directly to face region extraction or correction on face. In this method is disclosed how a specific region in a partial region is extracted after specification of the partial region.

However, each of the 4 methods described above respectively have problems described below.

The identification photograph system described in U.S. Patent Application Publication No. 20010005222 deals with an identification photograph with a simple background. Therefore, automatic separation of a person from the background is comparatively easy, and hair or clothes can also be extracted. However, since a photograph generally has a complex background, this system cannot be applied simply to a general photograph. In addition, automatic adjustment of skin color may not result in appropriate correction, and means for manual correction is necessary.

In the automatic dodging method for face described in Japanese Unexamined Patent Publication No. 10(1998)-126184, a face having been subjected to correction is simply composited with the background. Therefore, depending on accuracy of face region extraction, an outline of face may be distorted, and an unnatural image may result from the compositing. In addition, a combination of hair color with face may lead to generation of an unnatural image, since only a skin region in face is considered in dodging. Furthermore, since a photograph generally has a complex background, probability of failure of the automatic face detection is high.

In the face extraction method described in Japanese Unexamined Patent Publication No. 2001-209802, an operation for positioning a face template is troublesome and inefficient.

The region specification method described in U.S. Pat. No. 7,024,035 only discloses the method of specific region extraction from a manually specified region, and does not propose an efficient method of face or skin correction.

In addition to the methods described above, manual partial image processing may be carried out with use of image processing software such as Photoshop® available on the market. However, operations therefor are complex and inefficient.

SUMMARY OF THE INVENTION

The present invention has been conceived based on consideration of the above circumstances. An object of the present invention is therefore to provide a method, an apparatus, and a program for digital photograph image correction that appropriately and efficiently correct lightness and color of a face in a general photograph in a natural manner through extraction of the face from the photograph with certainty.

An image correction method of the present invention comprises the steps of:

specifying a region including the face of one person in an image of people as a subject of the image displayed in a screen of image display means, in response to an input from an operator;

extracting a correction target region including at least the face of the person in the image, based on information on at least one of hue, saturation, lightness, and a position of an outline of the specified region;

setting a degree of correction to be carried out on each position in the correction target region, in such a manner that the degree of correction becomes lower from the inside of the correction target region to the outside thereof near a boundary of the correction target region; and correcting at least one of hue, saturation and lightness in the correction target region, based on the degree of correction.

An image correction apparatus of the present invention comprises:

image display means for displaying an image on a screen;

region specification means for specifying a region including the face of one person in an image of people as a subject of the image displayed in the screen of the image display means, in response to an input from an operator;

correction target region extraction means for extracting a correction target region including at least the face of the person in the image, based on information on at least one of hue, saturation, lightness, and a position of an outline of the specified region;

correction degree setting means for setting a degree of correction to be carried out on each position in the correction target region, in such a manner that the degree of correction becomes lower from the inside of the correction target region to the outside thereof near a boundary of the correction target region;

correction means for correcting at least one of hue, saturation and lightness in the correction target region, based on the degree of correction; and display control means for displaying the image having been corrected by the correction means in the screen of the image display means.

In the image correction apparatus of the present invention, the correction target region extraction means may extract a skin region including the face of the person as the correction target region, based on at least the hue information of the specified region.

In the image correction apparatus of the present invention, the correction target region extraction means may extract the skin region including the face of the person according to at least the hue information of the specified region and may extract a hair region of the person according to at least the lightness information of the image. In this case, the correction target region extraction means can extract a region comprising the skin region and the hair region as the correction target region.

In the image correction apparatus of the present invention, the specified region may be a region whose outline is a rectangle that approximately circumscribes the face and hair of the person. In this case, the correction target region extraction means extracts the skin region including the face of the person according to at least the hue information of the specified region, and extracts an upper outline of the hair region of the person by approximating the upper outline as an elliptic arc inscribing the outline of the specified region according to the outline position information of the specified region. The correction target region extraction means then extracts a region surrounding the skin region and the upper outline of the hair region, as the correction target region.

In the image correction apparatus of the present invention, in the case where the specified region is the region whose outline is the rectangle that approximately circumscribes the face and hair of the person, the correction target region extraction means may extract a lower outline of the face region of the person by approximating the lower outline as an elliptic arc inscribing the outline of the specified region according to the outline position information of the specified region and may extract the hair region of the person according to at least the lightness information of the image. In this case, the correction target region extraction means extracts a region surrounding the lower outline of the face region and the hair region, as the correction target region.

In the case where the specified region is the region whose outline is the rectangle that approximately circumscribes the face and hair of the person in the image correction apparatus of the present invention, the correction target region extraction means may extract the lower outline of the face region and the upper outline of the hair region of the person by approximating the outlines as elliptic arcs inscribing the outline of the specified region according to the outline position information of the specified region. The correction target region extraction means then extracts a region surrounding the lower outline of the face region and the upper outline of the hair region, as the correction target region.

In the image correction apparatus of the present invention, the correction means may carry out the correction by increasing or decreasing a preset component related to at least one of hue, saturation, and lightness, according to an input from the operator.

In the image correction apparatus of the present invention, the correction means may determine a correction value for correcting the correction target region, based on a difference between a predetermined lightness value as a target of correction of the correction target region and either a mean value or an intermediate value of lightness in the correction target region.

In the image correction apparatus of the present invention, the correction degree setting means may set the degree of correction in such a manner that the degree of correction changes more gradually near the boundary of the correction target region as correlation of color becomes weaker between the inside and the outside of the correction target region.

The correlation of color may be a difference in lightness, a sum of differences in red, blue, and green components, or a sum of differences in hue, saturation, and lightness, for example.

A program of the present invention is a program for causing a computer to function as:

region specification means for specifying a region including the face of one person in an image of people as a subject of the image displayed in a screen of image display means, in response to an input from an operator;

correction target region extraction means for extracting a correction target region including at least the face of the person in the image, based on information on at least one of hue, saturation, lightness, and a position of an outline of the specified region;

correction degree setting means for setting a degree of correction to be carried out on each position in the correction target region, in such a manner that the degree of correction becomes lower from the inside of the correction target region to the outside thereof near a boundary of the correction target region;

correction means for correcting at least one of hue, saturation and lightness in the correction target region, based on the degree of correction; and display control means for displaying the image having been corrected by the correction means in the screen of the image display means.

The program of the present invention may be provided in the form of a computer-readable recording medium storing the program.

In addition, the program of the present invention may be provided through downloading thereof via a network.

According to the image correction method, the image correction apparatus, and the image correction program of the present invention, semi-automatic extraction of the correction target region is carried out. In other words, the correction target region including the face region of the person is extracted automatically in the region specified by the operator. The correction is then carried out by setting the degree of correction to change gradually near the boundary of the correction target region. Therefore, even in the case of a portrait with a complex background that causes automatic correction target region detection to be difficult, the correction target region including the face region of the person can be accurately and efficiently extracted. In addition, the correction can be carried out in a state where the boundary between the correction target region and the remaining region is blurred. In this manner, a face can be extracted with certainty in a general image, and lightness and color thereof can be corrected appropriately and efficiently in a natural manner.

BRIEF DESCRIPTION OF THE DRAWINGS

FIG. 5 is a flow chart showing a procedure carried out in extraction of a correction target region Rm and generation of a mask image;
FIGS. 6A to 6C show distributions of hue, saturation, and lightness of a skin region;
FIG. 12 shows a relationship between a hair region and a background region in a lightness histogram;
FIG. 13 shows a method of extraction of a lower outline of a face region and an upper outline of a hair region;
and
FIG. 14 shows a mask blurred near a boundary of the hair.

DESCRIPTION OF THE PREFERRED EMBODIMENT

Figure 1:
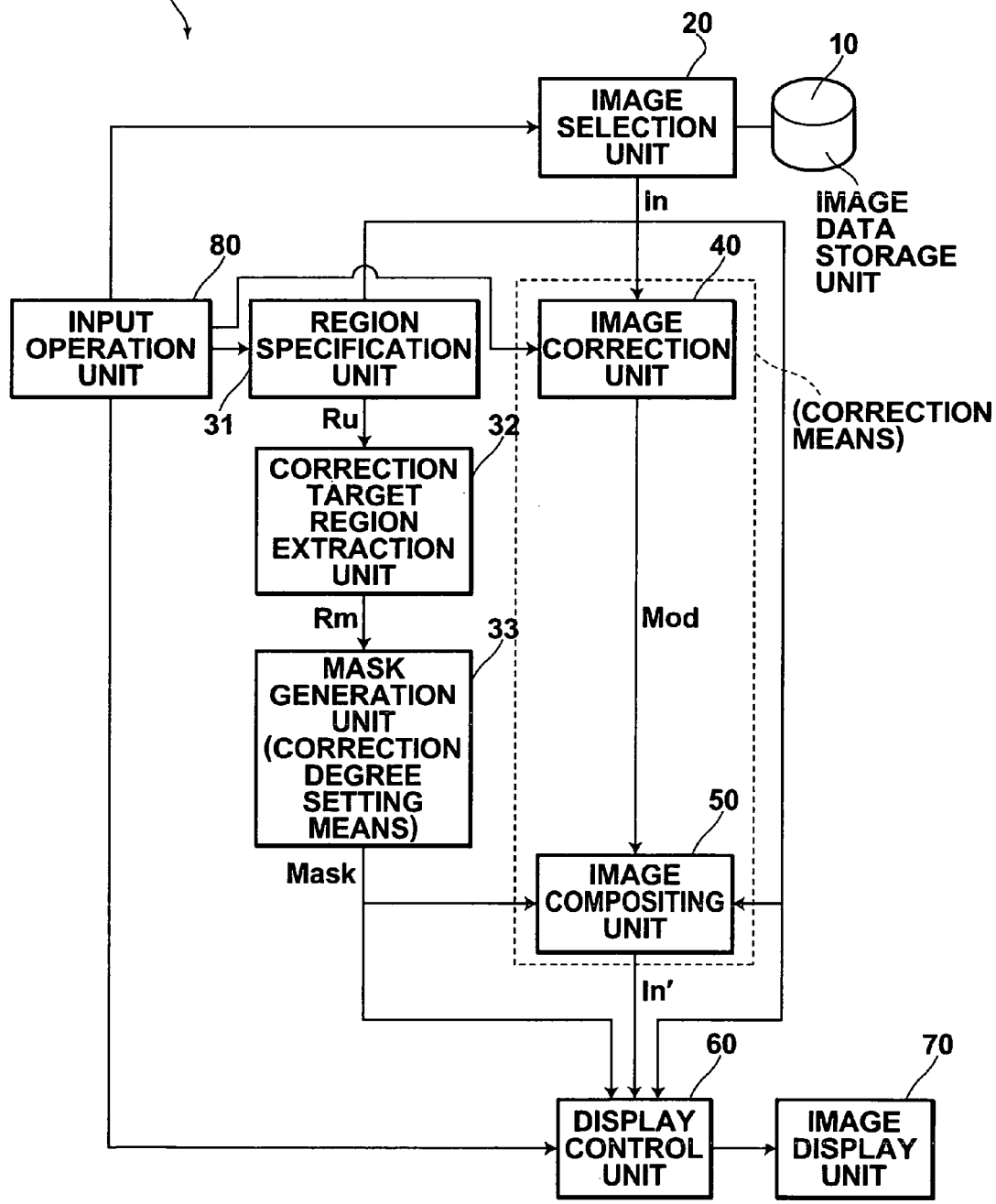
FIG. 1 is a block diagram showing the configuration of an image correction apparatus 1.

Hereinafter, an embodiment of the present invention will be described with reference to the accompanying drawings. FIG. 1 is a block diagram showing the configuration of an image correction apparatus 1 as an embodiment of the present invention. The image correction apparatus 1 is an apparatus for obtaining the same effect as so-called dodging in an analog photograph technique, and partially corrects only a face and surrounding skin shown dark in a digital image.

As shown in FIG. 1, the image correction apparatus 1 comprises an image data storage unit 10, an image selection unit 20, a region specification unit 31, a correction target region extraction unit 32, a mask generation unit (the correction degree setting means) 33, an image correction unit 40, an image compositing unit 50, a display control unit 60, an image display unit 70, and an input operation unit 80. The image data storage unit 10 stores a plurality of image data sets. The image selection unit 20 selects one of the image data sets representing an image of people (hereinafter referred to as the human image In) as a target of correction from the image storage unit 10. The region specification unit 31 specifies a region including the face of one person in the human image In represented by the selected image data set, in response to an input from an operator. The correction target region specification unit 32 extracts a correction target region Rm based on image information or the like of the specified region. The mask generation unit 33 generates a mask image Mask that determines a degree (a weight) of correction carried out on the correction target region and pixels therein. The image correction unit 40 obtains an entirely corrected image Mod by correcting at least one of hue, saturation, and lightness of the entire human image In. The image compositing unit 50 obtains a corrected image In' in which only the correction target region Rm has been corrected, by compositing the human image In, the mask image Mask, and the entirely corrected image Mod. The display control unit 60 displays the images represented by the image data sets stored in the image data storage unit 10, the human image In, the mask image Mask, the corrected image In', and the like, on a screen of the image display unit 70 in a predetermined layout, either in an automatic manner or in response to an input from the operator. The image display unit 70 displays various images in the screen under control of the display control unit 60. The input operation unit 80 is used for inputting information representing various kinds of requests to each of the units, such as image selection by the image selection unit 20 and selection of an image to be displayed on the image display unit 70.

The image correction unit 40 and the image compositing unit 50 function as the correction means of the image correction apparatus of the present invention.

The image data storage unit 10 comprises a magnetic recording device such as a hard disc that stores image data sets obtained by photography with a digital camera or by reading with a scanner.

The image selection unit 20 selects the human image as the target of correction from the image data sets stored in the image data storage unit 10, based on information input from the operator via the input operation unit 80 for identifying the image of correction target. For example, a catalog of images represented by the image data sets stored in the image data storage unit 10 is displayed in the form of thumbnail images on the screen of the image display unit 70, under control of the display control unit 60. The operator selects a desired one of the images as the correction target by using a GUI (Graphical User Interface) while viewing the screen.

The region specification unit 31 specifies the region including the face and hair of the person in the human image In input from the image selection unit 20, in response to the input from the operator. For example, the operator specifies predetermined two points by a pointer in the human image In displayed in the screen of the image display unit 70 while using a mouse and a keyboard comprising the input operation unit 80, and the region specification unit 31 specifies a rectangular region having the two points forming a diagonal thereof.

The correction target region specification unit 32 extracts the correction target region Rm including at least the face of the person from the region specified by the region specification unit 31 (hereinafter referred to as the specified region Ru), based on at least one of hue information, saturation information, lightness information, and outline position information of the specified region Ru. The correction target region Rm may represent only a face region, or a skin region including the face and skin other than the face, or a region including the face region and a hair region.

The mask generation unit 33 generates the mask image Mask that causes only the correction target region Rm to be corrected when the entire human image In is composited with the entirely corrected image Mod.

The mask image Mask has the same size (resolution) as the human image In, and has pixel values corresponding to the weight ranging from 0 to 1 according to the degree of correction for each of corresponding pixels in the human image In. The value 0 corresponds to the case where the correction degree is 0% and the value 1 corresponds to the case where the correction degree is 100%. Near a boundary of the correction target region Rm in the mask image Mask, the degree of correction to be carried out at each position in the correction target region Rm is set to be decreased gradually from the inside thereof to the outside thereof. The degree of correction changes more gradually near the boundary as a difference in lightness becomes smaller between the inside and the outside of the correction target region Rm.

The image correction unit 40 calculates correction values (extents of correction for respective predetermined components in the image) that seem to be appropriate for correction of the correction target region Rm, based on a difference between a predetermined value of lightness as a target of correction of the correction target region Rm and either a mean value or an intermediate value of lightness of the correction target region Rm. By using the correction values as initial correction values, the image correction unit 40 corrects the entire image In. Thereafter, the image having been subjected to the correction is displayed on the screen of the display unit 70 under control of the display control unit 60. In order to let the operator carry out fine adjustment of the correction values while viewing the screen, the image correction unit 40 has a function of changing the correction values based on information input therefor from the operator. The image is then corrected again based on the adjusted correction values, and the image having been subjected to the correction is displayed on the screen of the image display unit 70. The components to be corrected in the image are not specifically fixed. However, in order to ease operations related to the correction, the components are predetermined to be several components related to at least one of hue, saturation, and lightness. The operator can select any one of the components and can adjust the component. For example, in the case where the correctable components are strength of cyan (C), magenta (M), and yellow (Y) as well as lightness (D), items for the 4 components are displayed in the screen of the image display unit 70 under control of the display control unit 60. At the same time, a counter for displaying a level of correction for each of the components is displayed beside the corresponding item, and buttons for incrementing or decrementing the level step by step are also displayed. The operator adjusts the correction levels by using the GUI.

The image compositing unit 50 obtains the corrected image In' in which only the correction target region Rm has been corrected, by compositing the entirely corrected image Mod and the original human image In for each of the pixels therein according to the predetermined weight represented by the mask image Mask. More specifically, the image compositing unit 50 obtains the corrected image In' by compositing the images according to Equation (1) below:

$$In'(x,y)=Mask(x,y) \times Mod(x,y)+(1-Mask(x,y)) \times In(x,y) \quad (1)$$

In Equation (1), x and y denote x and y coordinates in the images, and Mask(x,y) satisfies $1 \geq Mask(x,y) \geq 0$.

The display control unit 60 controls an image to be displayed on the screen of the image display unit 70 and layout thereof, based on information representing various kinds of instructions input by the operator via the input operation unit 80.

The image display unit 70 comprises a CRT monitor or a liquid crystal panel or the like for displaying various images on the screen under control of the display control unit 60.

The input operation unit 80 comprises the mouse, the keyboard, and the like, connected by interfaces for realizing the GUI.

Figure 2:
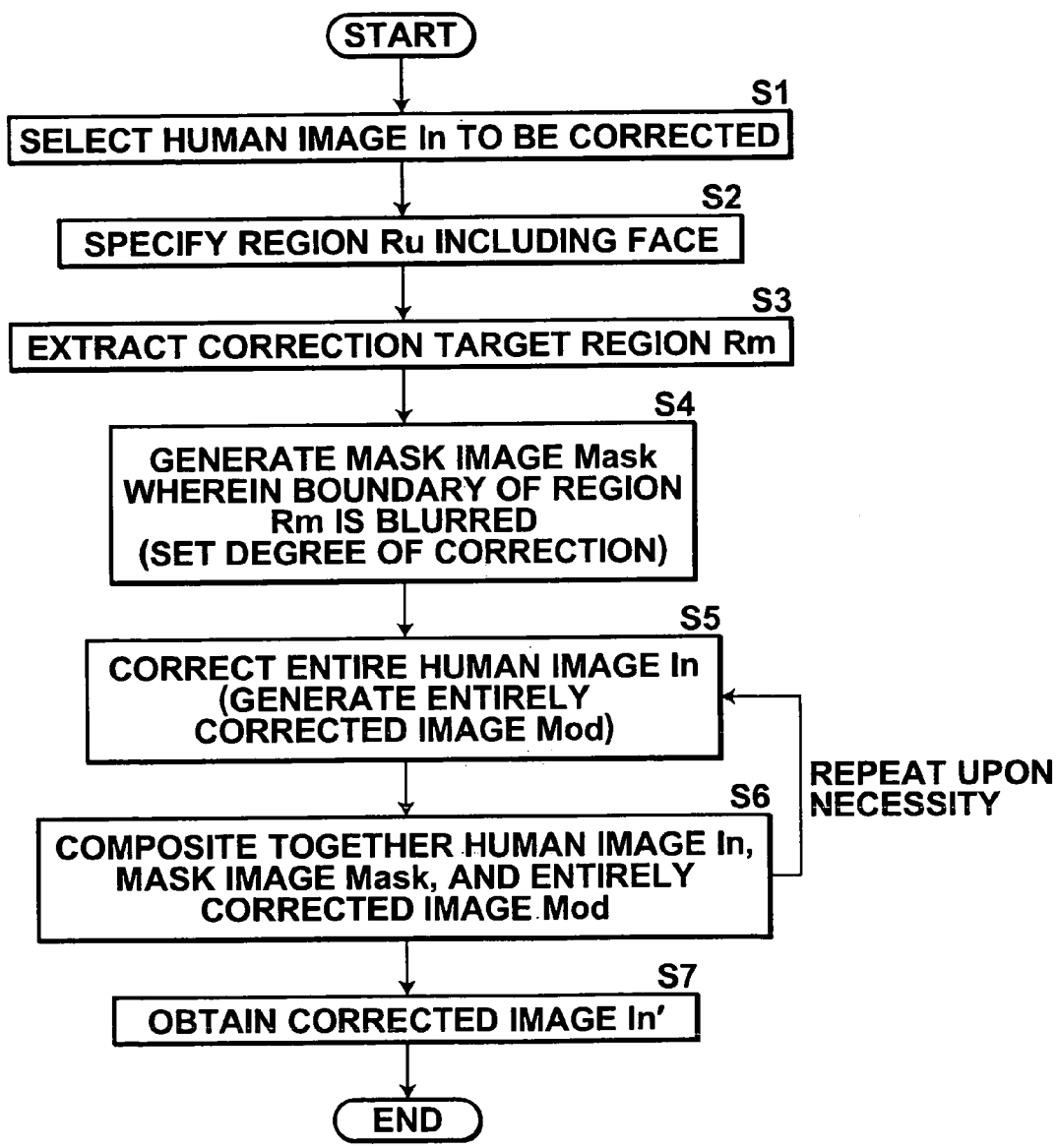
FIG. 2 is a flow chart showing a procedure carried out in the image correction apparatus 1.

A procedure carried out in the image correction apparatus 1 in this embodiment will be described next. FIG. 2 is a flow chart showing the procedure carried out therein.

Figure 3:
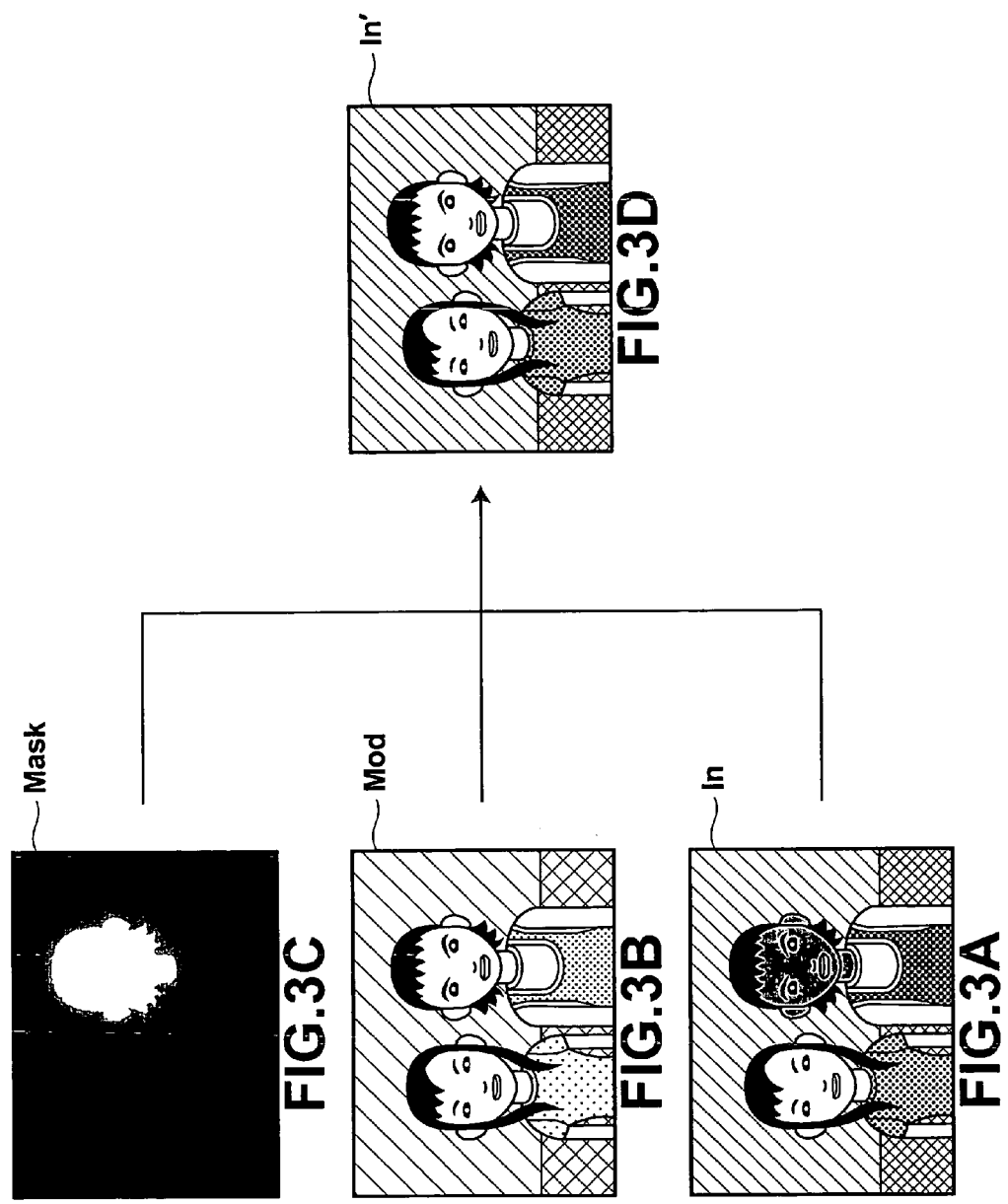
FIGS. 3A to 3D show examples of images before and after correction and an image used for correction.

The catalog of the images represented by the image data sets stored in the image data storage unit 10 is shown as the thumbnail images on the screen of the image display unit 70 under control of the display control unit 60, either in an automatic manner or in response to a request made by the operator. When the operator inputs the information for identifying the human image among the images by using the GUI, the image selection unit 20 selects the image as the human image In to be corrected, based on the information (Step S1). FIG. 3A shows an example of the human image In selected in this manner. In the human image In shown in FIG. 3A, an Asian man and an Asian woman are shown and the man is much more tanned than the woman.

Figure 4:
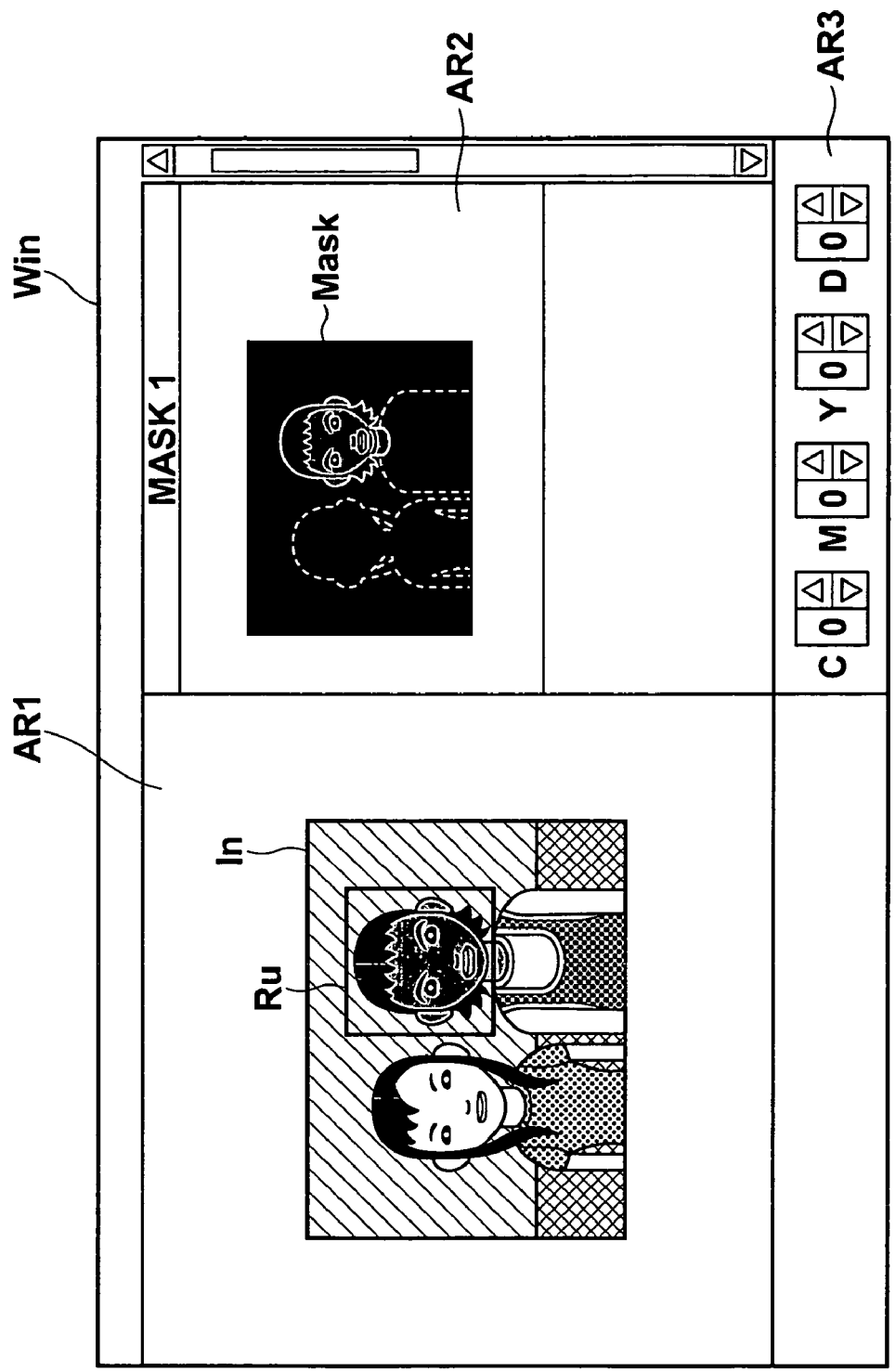
FIG. 4 shows an example of layout of images displayed in a screen of an image display unit 70.

Once the human image In as the correction target has been selected, the a window Win comprising an area AR1, an area AR2, and an area AR3 is displayed on the screen of the image display unit 70, as shown in FIG. 4. In the area AR1 is shown either the original human image In or the corrected image In' in which the effect of correction has been reflected. In the area AR2 are shown the mask image Mask superposed on the human image In in alignment at a position of the correction target region Rm. In the area AR3, the levels of the components C, M, Y, and D and the buttons for correcting the levels are shown for the correction target region Rm in the human image In. At this stage, the human image In is shown in the area AR1, and no image is displayed in the area AR2.

When the operator inputs information for identifying the rectangular region including the face and hair of the person having the face and skin to be corrected in the displayed human image In by using the GUI, the region specification unit 31 specifies the rectangular region as the specified region Ru based on the information (Step S2).

The correction target region extraction unit 32 extracts a skin region including the face of the person in addition to a hair region thereof from the specified region Ru according to a predetermined algorithm. The correction target region extraction unit 32 extracts a region surrounding the skin region and the hair region as the correction target region Rm (Step S3). How the correction target region Rm is extracted will be described later in detail.

The mask generation unit 33 generates the mask image Mask in which the degree of correction for the extracted correction target region Rm satisfies the condition described above (Step S4). How the mask image Mask is generated will be described later in detail. FIG. 3C shows an example of the mask image Mask generated in this manner. The mask image Mask shown in FIG. 3C is a mask image for the case where a region surrounding skin including the face and hair of the man as a subject of the image has been extracted as the correction target region Rm, and a boundary of the correction target region is blurred. In the area AR2 in the window Win shown in the screen of the image display unit 70, the human image In is superposed on the mask image Mask in alignment at the correction target region Rm. By viewing the image in the area AR2, the operator can confirm whether or not the extracted correction target region Rm is a desired region.

The image correction unit 40 detects a skin-color region in the extracted correction target region Rm, and calculates a correction value Dmod causing lightness of the skin-color region to be appropriate. More specifically, saturation of each of the pixels is found in the correction target region Rm, and a region excluding pixels whose saturation is lower than a predetermined threshold value is extracted in the correction target region Rm. In this manner, the skin-color region excluding hair, eyebrows, irises, and shadow is extracted in the correction target region Rm. Lightness of each of the pixels in the skin-color region is found, and a mean value Dave or an intermediate value Dmid of the lightness is then found. The lightness correction value Dmod is found by subtraction of Dave or Dmid from a lightness value Dideal as the correction target (that is, a lightness value that is preferable for human skin in a photograph image). In other words, Dmod=Dideal−(Dave or Dmid). Based on the lightness correction value Dmod, the initial values are then set for the correction values for the respective components. For example, the correction values for correcting the respective components of C, M, and Y (or R, G, B) are defined as the levels of correction, and a signal value for each of the components of each of the pixels is converted according to a conversion curve (such as a one-dimensional look-up table) corresponding to the correction level.

The image correction unit 40 entirely corrects the human image In by using the initial correction values, and the human image having been subjected to the correction is then displayed on the screen of the image display unit 70 under control of the display control unit 60. While viewing the screen, the operator using the GUI carries out fine adjustment of the correction value for each of the components in order to cause the correction values to become appropriate, by clicking the buttons therefor displayed in the area AR3 in the window Win displayed on the screen of the image display unit 70.

The image correction unit 40 again carries out the correction on the entire human image In according to the settings of the correction values having been adjusted, for obtaining the entirely corrected image Mod (Step S5). The entirely corrected image Mod is displayed on the screen. FIG. 3B shows an example of the entirely corrected image Mod obtained in this manner. The entirely corrected image Mod shown in FIG. 3B shows a state wherein lightness of the entire human image In has been corrected to become higher in such a manner that the skin region including the face of the man as the subject has the same lightness as that of skin of the woman in the human image In before the correction.

The image compositing unit 50 composites the images according to Equation (1) above, and the human image is obtained in a state wherein only the correction target region has been subjected to the desired correction while the effect of the correction is blurred near the boundary of the correction target region Rm (Step S6). The display control unit 60 carries out control for displaying the updated image in the area AR1 in the screen of the image display unit 70.

The procedure at Steps S5 and S6 is repeated upon necessity, and the corrected image In' is obtained through the desired correction on the human image In (Step S7). FIG. 3D shows an example of the corrected image In' obtained in this manner. In the corrected image In' shown in FIG. 3D, the skin region of the man has been corrected to become lighter so that the skin region of the man has the same lightness as a skin region of the woman.

How the correction target region Rm is extracted and how the mask image Mask is generated will be described below in detail. An outline of a flow of this processing is explained first, followed by description of more specific processing.

FIG. 5 is a flow chart showing a basic procedure in extraction of the correction target region Rm and generation of the mask image Mask. The algorithm for the basic procedure is roughly divided into 4 parts, namely extraction of skin seed, growth of the skin seed, detection of hair, and generation of mask. The "skin seed" refers to a group of pixels extracted with high reliability as pixels belonging to a skin region.

In extraction of skin seed, skin pixels with high reliability (hereinafter referred to as the high reliability skin pixels) are extracted by using histograms of hue, saturation, and lightness in the rectangular region Ru specified by the operator (Step S11). Whether or not a sufficient number of pixels have been extracted as the skin seed is then judged (Step S12). If a result of the judgment is negative, judgment conditions using threshold values based on hue, saturation, and lightness are eased for separating the high reliability skin pixels, and the high reliability skin pixels are extracted again in the specified region Ru (Step S13). After extraction of the high reliability skin pixels, gaps between the high reliability skin pixels are filled by using a closing operation of a morphology filter, and several discontinuous skin regions are obtained in the specified region Ru (Step S14). Since some of the skin regions obtained in this manner may belong to the background, the largest skin region is selected as the skin seed to be grown for expansion.

In growth of skin seed, an outline of the skin seed region is extracted, and pixels on the outline are sampled at predetermined intervals. The pixels obtained by the sampling are seed pixels used for growth of the skin seed. For each of the seed pixels, hue, saturation, and lightness of a predetermined region neighboring the seed pixel are examined, and a region satisfying a predetermined condition is added as a skin region for skin region growth. If the skin region growth is carried out for all the seed pixels, a larger skin region is obtained as a result thereof. The same procedure such as the outline extraction, the seed pixel setting, and the skin region growth is carried out on the expanded skin region, and a much larger skin region is then obtained. This procedure is repeated until no neighboring pixel to grow exists or until this repetition reaches a predetermined number (Steps S15, S16).

For detection of hair, a histogram is found for lightness of pixels in a region not belonging to the skin region in the human image In, and the histogram is divided into a part comprising low lightness pixels and a part comprising high lightness pixels. The hair region is highly likely to be included in the part of low lightness pixels. Therefore, a group of pixels belonging to a region having the largest area in the histogram is extracted as the hair region from the part of low lightness pixels (Step S17). A region surrounding the skin region including the face and the hair region extracted in this manner is extracted as the correction target region Rm.

In generation of mask, the mask image Mask is generated so as to have the same size as the human image In and so as to cut the correction target region Rm. At this time, the boundary of the correction target region Rm is blurred according to the difference in lightness (contrast) between the inside and the outside of the correction target region Rm (Step S18).

Hereinafter, each of the 4 parts will be described in detail.
(Extraction of Skin Seed)

In this part, the group of pixels that most probably represents skin is extracted as the skin seed for skin region growth, in the rectangular region Ru specified by the operator. The fact has become clear from experience of the applicant that a skin region appears in a predetermined range of narrow width in distribution of hue. FIGS. 6A to 6C show distributions of hue, saturation, and lightness in a skin region when gradation ranges from 0 to 255. According to the distributions in FIGS.

6A to 6C, the hue of the skin region appears in a range of 235~255 and in a range of 0~30 in comparatively narrow widths while saturation and lightness spread more over the entire range of 0 to 255. Based on the distributions of hue, saturation, and lightness, the distribution of hue is more reliable for extraction of skin region than the distributions of saturation and lightness.

Figure 7:
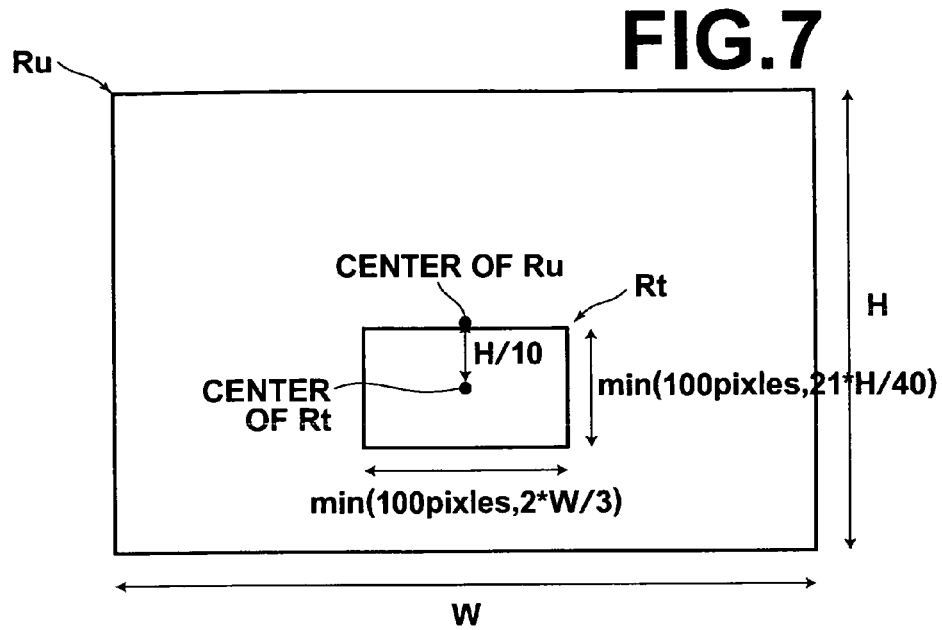
FIG. 7 shows a relationship between a specified region Ru and a reliable region Rt.

As shown in FIG. 7, a rectangular region of high reliability (hereinafter referred to as the reliable region Rt) is selected in the region Ru specified by the operator. The reliable region Rt is a rectangular region whose center is located at H/10 pixels below the center of the specified region Ru where H is the number of pixels in the vertical width of the specified region Ru. The vertical width of the reliable region Rt is the smaller one between 100 pixels and (21×H/40) pixels, and the horizontal width of the region Rt is the smaller one between 100 pixels and (2×W/3) pixels where W is the number of pixels in the horizontal width of the specified region Ru. The center of the region Ru specified by the operator may fall within the skin region or may be in an eye or eyebrow. In the latter case, a neighbor of the center cannot be used as the skin region. In addition, the specified region Ru may include a background region that is similar to skin. However, since the center of the specified region Ru belongs to face in most cases, a small region near the center is almost entirely the skin region. For this reason, the reliable region Rt defined in the above manner is selected, and image information in the region is obtained.

Figure 8:
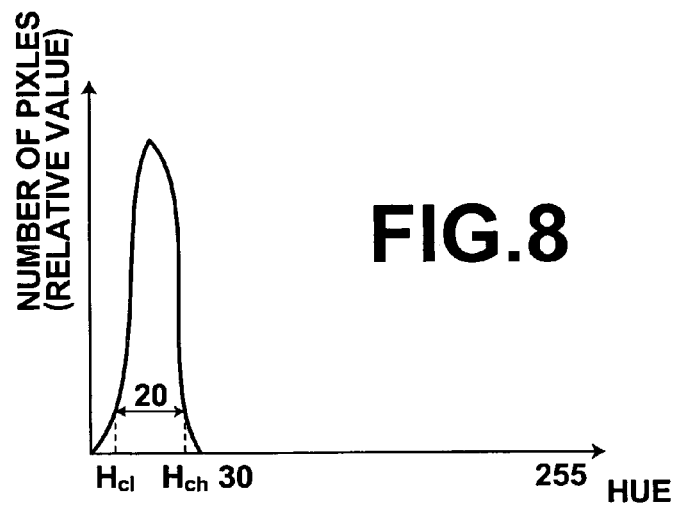
FIG. 8 shows a predetermined range in a hue histogram used for extraction of a skin region.
Figure 9:
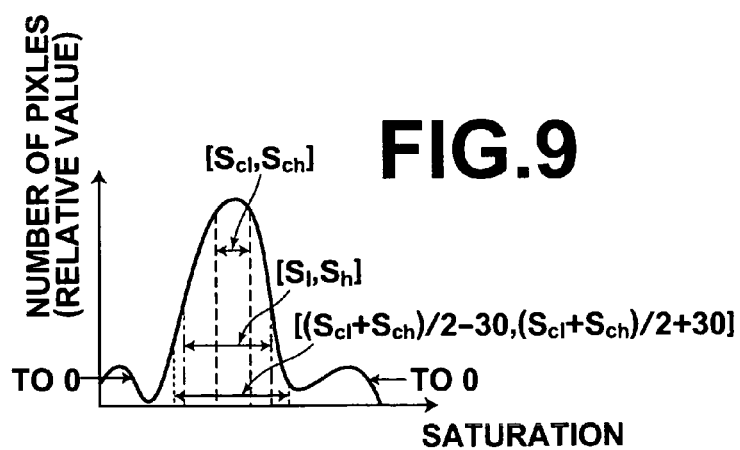
FIG. 9 shows predetermined ranges in a saturation histogram used for extraction of the skin region.

After selection of the reliable region Rt, pixels whose hue ranges from 250 to 255 and 0 to 20 are selected as most probable skin pixels. A hue histogram of these pixels is then found. As shown in FIG. 8, a range [Hcl, Hch] having the largest number of pixels in a predetermined width (such as 20) is extracted in the hue histogram. Likewise, ranges [Scl, Sch] and [Icl, Ich] respectively having the largest number of pixels in predetermined widths (such as 30 for saturation and 40 for lightness) are extracted in the histograms of saturation and lightness. Based on these ranges, the threshold values for skin separation are set. Firstly, pixels whose hue is in the ranges from 250 to 255 and from 0 to 20 (these ranges are continuous with each other and referred to as [Hl, Hh]) are extracted in the specified region Ru according to the same method used for extraction of the pixels in the reliable region Rt, and histograms of saturation and lightness of the extracted pixels are then found. In the histogram of saturation, bins other than a range of [(Scl+Sch)/2−30, (Scl+Sch)/2+30] are set to have 0 pixel while bins other than a range of [(Icl+Ich)/2−40, (Icl+Ich)/2+40] are set to have 0 pixel in the histogram of lightness. In the new histograms generated by cutting the both ends in the above manner, ranges [Sl, Sh] and [Il, Ih] having the largest number of pixels in predetermined widths (such as 30 for saturation and 40 for lightness) are extracted respectively. FIG. 9 shows an example of extraction of the range in the saturation histogram.

Pixels whose hue, saturation, and lightness are in the hue range [Hl, Hh], the saturation range [Sl, Sh], and the lightness range [Il, Ih] are finally extracted in the specified region Ru, as the most probable skin pixels. These pixels are obtained by judgment using the threshold values, and separated by a large number of small gaps to form discontinuous regions. Therefore, the gaps are filled by using the closing operation of the morphology filter, and the region having the largest area is selected as a skin seed Rskin1.

In the case where the number of pixels having been extracted according to the algorithm described above is not sufficient (such as 1000 pixels or H×W/8), the conditions for extraction of skin seed are eased. More specifically, the pixels whose hue is in the predetermined range are extracted in the reliable region Rt, and used as the most probable skin pixels. The gaps between the pixels are then filled by the closing operation of the morphology filter, and the region having the largest area is selected as the skin seed Rskin1.

(Growth of Skin Seed)

Figure 10A:
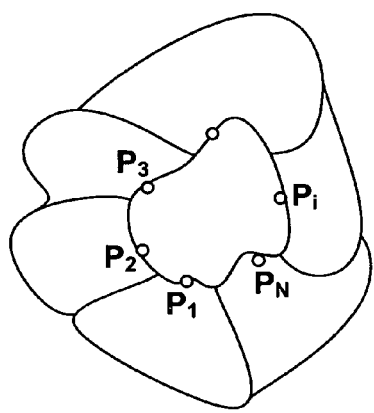
FIGS. 10A and 10B explain skin seed growing processing.

After the region of skin seed has been obtained, the skin seed region is grown according to an adaptive region growth method. Firstly, an outline CR1 of the skin seed region Rskin1 is extracted, and points (such as 32 points) P1, P2, . . . , Pn are sampled at predetermined intervals on the outline (hereinafter these points are called seed points). As shown in FIG. 10A, the region growth method is applied to each of the seed points Pi at the same time. The skin seed region is a continuous region, and the inside of the skin seed is equivalent to the seed points on the outline at the time of skin seed growth. The outline comprises a plurality of pixels, and color information is similar between two of the pixels that are not separated substantially. Therefore, in order to reduce repetition of seed growth processing, the seed points are set at the predetermined intervals. In order to grow the seed region, conditions for growth need to be set. The conditions are set in the following manner.

Figure 10B:
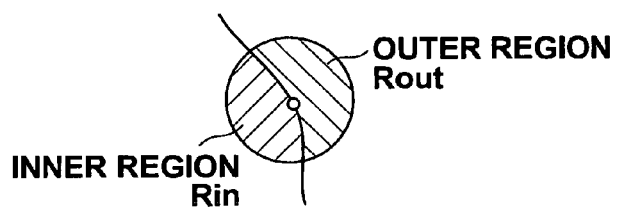
Figure 11A:
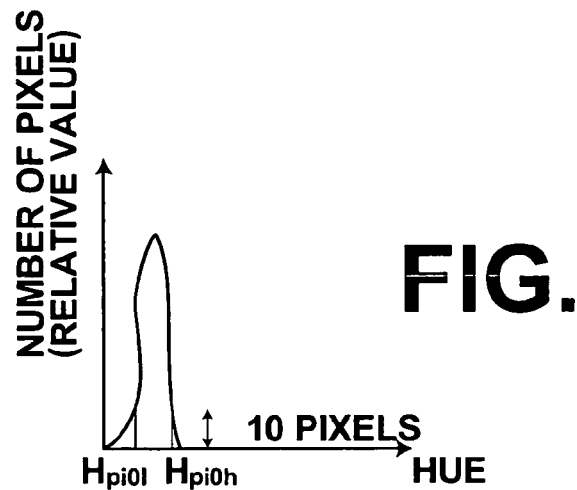
FIGS. 11A to 11C show predetermined ranges in histograms used for the skin seed growing processing.
Figure 11B:
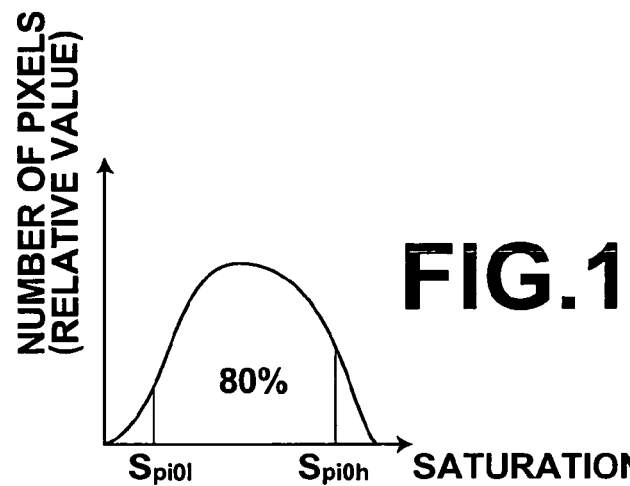
Figure 11C:
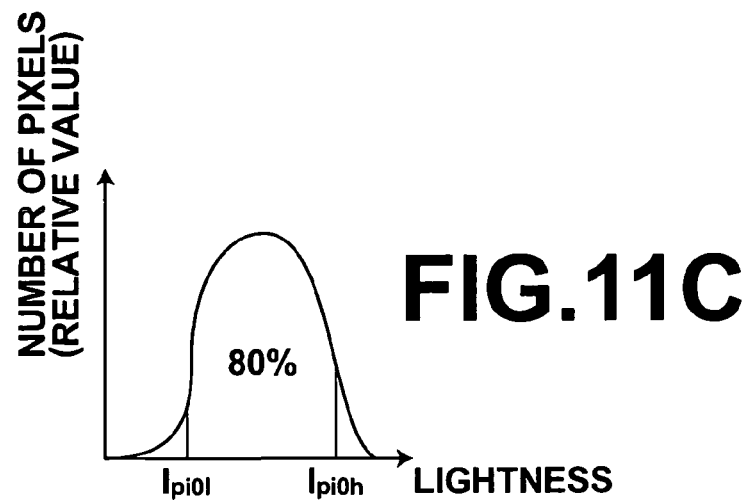

As shown in FIG. 10B, a circle whose center is located at the seed point Pi is drawn with a radius of 30 pixels, and an inner region Rin and an outer region Rout are obtained. The inner region Rin has been extracted as the skin region while the outer region Rout has not. Within the inner region Rin, histograms of hue, saturation, and lightness (hereinafter respectively referred to as Histhin, Histsin, and Histiin) are obtained. Likewise, histograms of hue, saturation, and lightness are obtained in the outer region Rout (hereinafter referred to as Histhout, Histsout, and Histiout). Based on the histograms Histhin, Histsin, and Histiin, initial ranges of hue, saturation, and lightness [Hpi0l, Hpi0h],[Spi0l, Spi0h], and [Ipi0l, Ipi0h] are selected as shown in FIGS. 11A to 11C. The range for hue is a range wherein the number of pixels in each of bins exceeds 10. The range for saturation is a range including 80% of pixels in the area of the histogram and excluding the top 10% and the bottom 10% thereof. Likewise, the range for lightness is a range including 80% of pixels in the area of the histogram and excluding the top 10% and the bottom 10% thereof. A maximum range is respectively found for hue, saturation, and lightness in the region Rin and in the region Rout. The maximum range refers to a range having the largest number of pixels among ranges of predetermined intervals (such as 10, 15, and 20 for hue, saturation, and lightness, respectively). The maximum ranges are represented in the inner regionRin as [Hinpeakl, Hinpeakh], [Sinpeakl, Sinpeakh], and [Iinpeakl, Iinpeakh], respectively. Likewise, the maximum ranges for the outer region Rout are [Houtpeakl, Houtpeakh], [Soutpeakl, Soutpeakh], and [Ioutpeakl, Ioutpeakh], respectively. The ranges in the inner region Rin are compared with those in the outer region Rout. In the case where the corresponding ranges are sufficiently close, the widths of the ranges are expanded. How the ranges are expanded is described below in detail.

1. if the distance between the center of $[H_{inpeakl}, H_{inpeakh}]$ and that of $[H_{outpeakl}, H_{outpeakh}] < 15$, then expand the range $[H_{pi0l}, H_{pi0h}]$ to $$[\min(H_{outpeakl}, H_{pi0l}), \max(H_{outpeakh}, H_{pi0h})] \quad (2)$$

2. if the distance between the center of $[S_{inpeakl}, S_{inpeakh}]$ and that of $[S_{outpeakl}, S_{outpeakh}] < 30$, then expand the range $[S_{pi0l}, S_{pi0h}]$ to $$[\min(S_{outpeakl}, S_{pi0l}), \max(S_{outpeakh}, S_{pi0h})] \quad (3)$$

3. if the distance between the center of $[I_{inpeakl}, I_{inpeakh}]$ and that of $[I_{outpeakl}, I_{outpeakh}]<15$,
then expand the range $[I_{pi0l}, I_{pi0h}]$ to $$[\min(I_{outpeakl}, I_{pi0l}), \max(I_{outpeakh}, I_{pi0h})] \quad (4)$$

More specifically, if a difference between intermediate values of the range [Hinpeakl, Hinpeakh] and the range [Houtpeakl, Houtpeakh] is smaller than 15, the range [Hpi0l, Hpi0h] is expanded to [min(Houtpeakl, Hpi0l), max(Houtpeakh, Hpi0h)]. The function min ($\alpha$, $\beta$) is a function that takes the smaller value between $\alpha$ and $\beta$ while the function max ($\alpha$, $\beta$) is a function that takes the larger value between $\alpha$ and $\beta$. If a difference between intermediate values of the range [Sinpeakl, Sinpeakh] and the range [Soutpeakl, Soutpeakh] is smaller than 30, the range [Spi0l, Spi0h] is extended to [min(Soutpeakl, Spi0l), max(Soutpeakh, Spi0h)]. Likewise, if a difference between intermediate values of the range [Iinpeakl, Iinpeakh] and the range [Ioutpeakl, Ioutpeakh] is smaller than 15, the range [Ipi0l, Ipi0h] is extended to [min (Ioutpeakl, Ipi0l), max(Ioutpeakh, Ipi0h)].

The ranges are further expanded to be applicable for the case where the face has fair skin or dark skin. It has been understood from experience that lightness and saturation take extremely wide ranges of values for fair skin and dark skin while hue does not change substantially. Therefore, the ranges for saturation and lightness are expanded while the range for hue is fixed.

In this manner, the ranges used as references for region growth (that is, ranges to be included in the skin region) have been obtained for hue, saturation, and lightness. During the region growth, neighboring pixels are continuously included in the skin region if the neighboring pixels are in the ranges, until no neighboring pixels to be included are found. This procedure of region growth is carried out on each of the seed points. Once the region growth has been completed for all the seed points, a larger skin region Rskin2 can be obtained. The same region growth method is then applied to the skin region Rskin2. The number of repetition of this procedure is approximately 5, for example.

However, the skin region is difficult to separate from the background that is similar to the skin region. In the case where hue of the background is close to that of skin color, the background of this color may be extracted as the skin region. In this case, the skin region is extracted by approximation using an elliptic arc inscribing the outline of the specified region Ru as a lower outline of the face region if the operator specifies the region Ru as a region whose outline is a rectangle that approximately circumscribes the face and hair of the person in the human image In.

In order to determine the ranges of hue, saturation, and lightness to be extracted as the skin region in the processing described above, the color information is used on the inside and the outside of the region that already has been extracted as the skin region. Since region growth is selection of similar pixels, the applicant firstly thought through experience that information only on the inside of the skin region was sufficient for region growth. However, only a part of face and skin was extracted in reality. Since saturation and lightness of skin tend to belong to wide ranges, a seed inside the skin region do not include information on neighboring external pixels even if hue is the same between the seed and the external pixels. For this reason, the information on the neighboring external pixels is also considered in the processing described above.

(Detection of Hair)

After the skin region has been extracted, the remaining region belongs to the hair region and the background region. Since hue and saturation tend to vary extremely in a hair region, hue and saturation are not easy to use for hair region extraction. However, distribution of lightness concentrates in a narrow range in most cases, and the lightness is low. Therefore, in order to distinguish the hair region from the background region, a threshold selection method is used. FIG. 12 shows a threshold selection method developed by Ootu, which can detect the hair region with accuracy. In this method, a threshold value Ti is selected in the lightness histogram according to a predetermined rule. For example, a pixel value causing a change rate in a cumulative lightness histogram to become minimal is selected as the threshold value Ti. Pixels whose lightness is lower than the threshold value Ti are then assumed to be hair-like pixels. Based on this method, a plurality of regions that may represent hair are extracted, from which the largest region in area is selected as the hair region. In some cases, two or more local maxima may appear in the lightness histogram, and the method of Otsu cannot detect the hair region appropriately in these cases. As a basic idea, only two of the local maxima are saved while the remaining local maxima of low reliability are excluded, and the method of Otsu is then applied thereto. However, problems still remain on how to know presence of the local maxima in the histogram or how to find the local maxima of low reliability. In order to solve these problems, a method described below can be used. As has been described above, lightness of the hair region is clearly low for most of the pixels therein. Therefore, the method of Otsu is applied after a bin whose range exceeds a predetermined value (such as 128) is set to have 0. In this method, an effect caused by the bin of the lightness range higher than the predetermined value (128 in this case) can be avoided, and the hair region has been detected successfully in an experiment according to this method.

However, the hair region is difficult to separate from a dark background. In the case where the background is dark, a curve including two local maxima is included in a range to be regarded as the hair region. In this case, as shown in FIG. 13, the hair region is extracted by approximation using an elliptic arc inscribing the outline of the specified region Ru as an upper outline of the hair region if the operator specifies the region Ru as a region whose outline is a rectangle that approximately circumscribes the face and hair of the person in the human image In.

After the skin region or the lower outline of the face region and the hair region or the upper outline of the hair region have been extracted in the above manner, the region surrounding the regions is extracted as the correction target region Rm.

(Generation of Mask)

Following the extraction of the correction target region Rm, the mask image Mask representing the weight is generated for obtaining the image wherein the correction is effective only on the correction target region Rm after the entirely corrected image Mod generated from the correction of the entire human image In is composited with the original image In by weighted addition thereof with use of the weight at pixels corresponding to each other therein.

The mask image Mask has the same size (resolution) as the human image In, and has the pixel values corresponding to the weight ranging from 0 to 1 according to the degree of correction (0 for the case where the degree of correction is 0% and 1 for the case where the degree of correction is 100%). In this example, the pixel values range from 0 to 255 in the mask image Mask, corresponding to the weight ranging from 0 to 1.

In order not to cause the corrected image In' having been subjected to the partial correction to become unnatural as a result of compositing together the human image In, the entirely corrected image Mod, and the mask image Mask, the mask is blurred. More specifically, the pixel values of the mask image Mask are set in such a manner that the degree of correction becomes gradually smaller from the inside of the correction target region Rm to the outside thereof, near the boundary of the correction target region Rm. In order to blur the mask, Gaussian blurring is applied to the mask image Mask. On the side of the head in the mask, a width of blur is defined according to a relationship with the selected rectangular region Rm. For example, a horizontal width is W/4 and a vertical width is H/4. On the side of skin, a boundary of skin is extracted in the mask, and a width of blur is defined according to a relationship between the horizontal and vertical widths of a boundary line segment. For example, a horizontal width of blur is W/4 and a vertical width thereof is H/4.

In order to better suppress an adverse effect caused by a dark background, the values in the mask are changed gradually on the outline of the hair region. More specifically, the values in the mask change in a range from 0 to 255 rather than taking either 0 or 255. In the case where the elliptic arc inscribing the outline of the specified region Ru has been selected as approximation of the upper outline of the hair region, the mask changes so as to take values from 0 to 255 from the inside thereof to the outside thereof, as shown in FIG. 14.

During deliberation on the mask, changing the color information only in the selected region was considered, and no effect on other regions was considered. However, in the case where color correlation (that is, correlation of color and lightness between images to be compared, such as difference in lightness, a sum of differences in red, green, and blue components, and a sun of differences in hue, saturation, and lightness) is strong between the inside and the outside of the boundary, a region where no correction is desired is affected by uniform blurring processing, causing the image to tend to be unnatural. Therefore, adaptive blurring processing, that is, the processing that changes a degree of blur according to the color correlation between the inside and the outside of the mask, is carried out. In other words, the degree of correction is set to change more gradually near the boundary of the correction target region Rm as the color correlation is weaker between the inside and the outside of the correction target region Rm. More specifically, a radius of a Gaussian function is increased, for example.

This setting is based on the following reason. Generally speaking, if the difference in lightness is large between the inside and the outside of the correction target region Rm, gradation tends to become conspicuous between the correction target region having been corrected and the outside thereof. In other words, the correction of the correction target region looks too apparent. Near the boundary of the correction target region, sharp change in the degree of correction is preferable. In addition, in the case where the difference in lightness is small between the inside and the outside of the correction target region, the boundary of the correction target region may not have been extracted with accuracy, and the poor extraction tends to become conspicuous (in such a manner that the boundary is not correct or has a rough outline). Therefore, the degree of correction is preferably changed gradually near the boundary of the correction target region. However, even in the case where the difference in lightness is small, if hue changes suddenly, the gradual change in the degree of correction according to the rule described above causes color gradation to become conspicuous in some cases. In such a case, the sum of the differences in red, green, and blue is also used for considering whether hue is similar. In other words, if hue is similar between the inside and the outside of the correction target region, the gradual change in the degree of correction is preferred near the boundary of the correction target region. Otherwise, the degree of correction preferably changes sharply near the boundary of the correction target region.

In uniform blurring processing with the same blurring degree, a Gaussian kernel is used for smoothing the boundary of the mask. Let the mask and a one-dimensional Gaussian kernel be denoted by Mask(i, j) and G=[g−n, g−(n−1), . . . , gn−1, gn] where n is the number of pixels in a radius. The mask can be blurred in the horizontal direction and in the vertical direction. One-dimensional blurring can be represented as follows:

$$\text{Mask}'(i,j) = \sum_{k=-n}^{n} \text{Mask}(i-k,j) \cdot g_k \text{ for horizontal blur} \quad (5)$$

$$\text{Mask}'(i,j) = \sum_{k=-n}^{n} \text{Mask}(i,j-k) \cdot g_k \text{ for vertical blur} \quad (6)$$

In adaptive blurring processing, a weight of blurring is introduced, and the equations of blurring processing can be rewritten as follows:

$$\text{Mask}'(i,j) = \sum_{k=-n}^{n} \text{Mask}(i-k,j) \cdot g_k \cdot \frac{256+th}{\text{abs}(I(i,j)-I(i-k,j))+th} \quad (7)$$
for horizontal blur $$\text{Mask}'(i,j) = \sum_{k=-n}^{n} \text{Mask}(i,j-k) \cdot g_k \cdot \frac{256+th}{\text{abs}(I(i,j)-I(i,j-k))+th} \text{ for vertical blur} \quad (8)$$

where th is an adjustment parameter. The larger th is, an effect of blurring is weakened by the difference in lightness abs(I(i, j)−I(i-k, j)) or abs(I(i, j)−I(i, j-k)). A value of th may be 80, for example.

As has been described above, according to the image correction apparatus in the embodiment of the present invention, semi-automatic extraction of the correction target region is carried out as automatic extraction of the correction target region including the face region of the person in the region specified by the operator, and the degree of correction is set to change gradually near the boundary of the correction target region. Therefore, even in the case where the human image has a complex background that causes the automatic detection to be difficult, the correction target region including the face region of the person can be extracted accurately and efficiently. In addition, the correction can be carried out while the boundary between the correction target region and the remaining region is blurred. In this manner, a face can be extracted with certainty from a general image and lightness and color of the face can be corrected appropriately and efficiently in a natural manner.

Furthermore, by including not only the face region but also the hair region in the correction target region, unnatural contrast or difference in hue does not tend to appear in the hair and the face in the corrected image, and natural image correction can be carried out.

The correction means comprising the image correction unit and the image compositing unit determines the correction values based on the difference between the target lightness value for the correction of the correction target region and the mean or intermediate value of actual lightness, for the predetermined components related to at least hue, saturation, and lightness. Thereafter, the correction is carried out according to fine adjustment thereof in response to input from the operator. Therefore, operations for the correction are easy, and the operator can obtain the desired correction result through the simple operations. Consequently, a large number of images can be corrected efficiently.

In this embodiment, the unique correction target region Rm is extracted in the sole human image In, and the correction is carried out on the correction target region. However, a plurality of correction target regions Rm1, Rm2 and so on may be extracted in the sole human image In. In this case, a plurality of mask images Mask1, Mask2 and so on for the regions and a plurality of entirely corrected images Mod1, Mod2 and so on are generated, and correction is carried out respectively on the correction target regions.

In the embodiment described above, the correction target region Rm is the region surrounding the skin region including the face and the hair region. However, the correction target region Rm may be extracted as a skin region including only the face without the hair region.

In the embodiment described above, the skin region including the face is the correction target. However, since the method of skin region extraction extracts only a region of skin color. Therefore, the correction target can be a skin region excluding face.

Although the image correction method and the image correction apparatus of the embodiment of the present invention have been described above, a program for causing a computer to execute the processing in the image correction apparatus is also an embodiment of the present invention. In addition, a computer-readable recording medium storing such a program is also an embodiment of the present invention.

What is claimed is:

1. An image correction method comprising the steps of:
specifying a region including the face of one person in an image of people as a subject of the image displayed in a screen of image display means, in response to an input from an operator;
extracting a correction target region including at least the face of the person in the image, based on information on at least one of hue, saturation, lightness, and a position of an outline of the specified region;
setting a degree of correction to be carried out on each position in the correction target region, in such a manner that the degree of correction becomes lower from the inside of the correction target region to the outside thereof near a boundary of the correction target region; and
correcting at least one of hue, saturation and lightness in the correction target region, based on the degree of correction.

2. An image correction apparatus comprising:
image display means for displaying an image on a screen;
region specification means for specifying a region including the face of one person in an image of people as a subject of the image displayed in the screen of the image display means, in response to an input from an operator;
correction target region extraction means for extracting a correction target region including at least the face of the person in the image, based on information on at least one of hue, saturation, lightness, and a position of an outline of the specified region;
correction degree setting means for setting a degree of correction to be carried out on each position in the correction target region, in such a manner that the degree of correction becomes lower from the inside of the correction target region to the outside thereof near a boundary of the correction target region;
correction means for correcting at least one of hue, saturation and lightness in the correction target region, based on the degree of correction; and
display control means for displaying the image having been corrected by the correction means in the screen of the image display means.

3. The image correction apparatus according to claim 2, wherein the correction target region extraction means extracts a skin region including the face of the person as the correction target region, based on at least the information on hue of the specified region.

4. The image correction apparatus according to claim 3, wherein the correction means determines a correction value for correcting the correction target region, based on a difference between a predetermined lightness value as a target of correction of the correction target region and either a mean value or an intermediate value of lightness in the correction target region.

5. The image correction apparatus according to claim 3, wherein the correction degree setting means sets the degree of correction in such a manner that the degree of correction changes more gradually near the boundary of the correction target region as correlation of color becomes weaker between the inside and the outside of the correction target region.

6. The image correction apparatus according to claim 2, the correction target region extraction means extracting a skin region including the face of the person according to at least the information on hue of the specified region, the correction target region extraction means extracting a hair region of the person according to at least the information on lightness of the image, and the correction target region extraction means extracting a region comprising the skin region and the hair region as the correction target region.

7. The image correction apparatus according to claim 6, wherein the correction means determines a correction value for correcting the correction target region, based on a difference between a predetermined lightness value as a target of correction of the correction target region and either a mean value or an intermediate value of lightness in the correction target region.

8. The image correction apparatus according to claim 6, wherein the correction degree setting means sets the degree of correction in such a manner that the degree of correction changes more gradually near the boundary of the correction target region as correlation of color becomes weaker between the inside and the outside of the correction target region.

9. The image correction apparatus according to claim 2, the specified region being a region the outline of which is a rectangle that approximately circumscribes the face and hair of the person,
the correction target region extraction means extracting a skin region including the face of the person according to at least the information on hue of the specified region, the correction target region extraction means extracting an upper outline of a hair region of the person by approximating the upper outline as an elliptic arc inscribing the outline of the specified region according to the information on the position of the outline of the specified region, and the correction target region extraction means extracting a region surrounding the skin region and the upper outline of the hair region as the correction target region.

10. The image correction apparatus according to claim 9, the correction means determines a correction value for correcting the correction target region, based on a difference between a predetermined lightness value as a target of correction of the correction target region and either a mean value or an intermediate value of lightness in the correction target region.

11. The image correction apparatus according to claim 9, wherein the correction degree setting means sets the degree of correction in such a manner that the degree of correction changes more gradually near the boundary of the correction target region as correlation of color becomes weaker between the inside and the outside of the correction target region.

12. The image correction apparatus according to claim 2, the specified region being a region the outline of which is a rectangle that approximately circumscribes the face and hair of the person,
    the correction target region extraction means extracting a lower outline of a face region of the person by approximating the lower outline as an elliptic arc inscribing the outline of the specified region according to the information on the position of the outline of the specified region, the correction target region extraction means extracting a hair region of the person according to at least the information on lightness of the image, and the correction target region extraction means extracting a region surrounding the lower outline of the face region and the hair region as the correction target region.

13. The image correction apparatus according to claim 12, wherein the correction means determines a correction value for correcting the correction target region, based on a difference between a predetermined lightness value as a target of correction of the correction target region and either a mean value or an intermediate value of lightness in the correction target region.

14. The image correction apparatus according to claim 12, wherein the correction degree setting means sets the degree of correction in such a manner that the degree of correction changes more gradually near the boundary of the correction target region as correlation of color becomes weaker between the inside and the outside of the correction target region.

15. The image correction apparatus according to claim 2, the specified region being a region the outline of which is a rectangle that approximately circumscribes the face and hair of the person,
    the correction target region extraction means extracting a lower outline of a face region and an upper outline of a hair region of the person by approximating the outlines as elliptic arcs inscribing the outline of the specified region according to the information on the position of the outline of the specified region, and the correction target region extraction means extracting a region surrounding the lower outline of the face region and the upper outline of the hair region as the correction target region.

16. The image correction apparatus according to claim 15, wherein the correction means determines a correction value for correcting the correction target region, based on a difference between a predetermined lightness value as a target of correction of the correction target region and either a mean value or an intermediate value of lightness in the correction target region.

17. The image correction apparatus according to claim 15, wherein the correction degree setting means sets the degree of correction in such a manner that the degree of correction changes more gradually near the boundary of the correction target region as correlation of color becomes weaker between the inside and the outside of the correction target region.

18. The image correction apparatus according to claim 2, wherein the correction means carry out the correction by increasing or decreasing a preset component related to at least one of hue, saturation, and lightness, according to an input from the operator.

19. The image correction apparatus according to claim 2, wherein the correction means determines a correction value for correcting the correction target region, based on a difference between a predetermined lightness value as a target of correction of the correction target region and either a mean value or an intermediate value of lightness in the correction target region.

20. The image correction apparatus according to claim 2, wherein the correction degree setting means sets the degree of correction in such a manner that the degree of correction changes more gradually near the boundary of the correction target region as correlation of color becomes weaker between the inside and the outside of the correction target region.

21. A computer-readable recording medium storing a program for causing a computer to function as:
    region specification means for specifying a region including the face of one person in an image of people as a subject of the image displayed in a screen of image display means, in response to an input from an operator;
    correction target region extraction means for extracting a correction target region including at least the face of the person in the image, based on information on at least one of hue, saturation, lightness, and a position of an outline of the specified region;
    correction degree setting means for setting a degree of correction to be carried out on each position in the correction target region, in such a manner that the degree of correction becomes lower from the inside of the correction target region to the outside thereof near a boundary of the correction target region;
    correction means for correcting at least one of hue, saturation and lightness in the correction target region, based on the degree of correction; and
    display control means for displaying the image having been corrected by the correction means in the screen of the image display means.

* * * * *